Oct. 11, 1966     J. R. GRAHAM     3,278,663
METHOD FOR PRODUCING BIAXIALLY ORIENTED
EXTRUDED POLYMERIC FILM
Filed Feb. 4, 1963
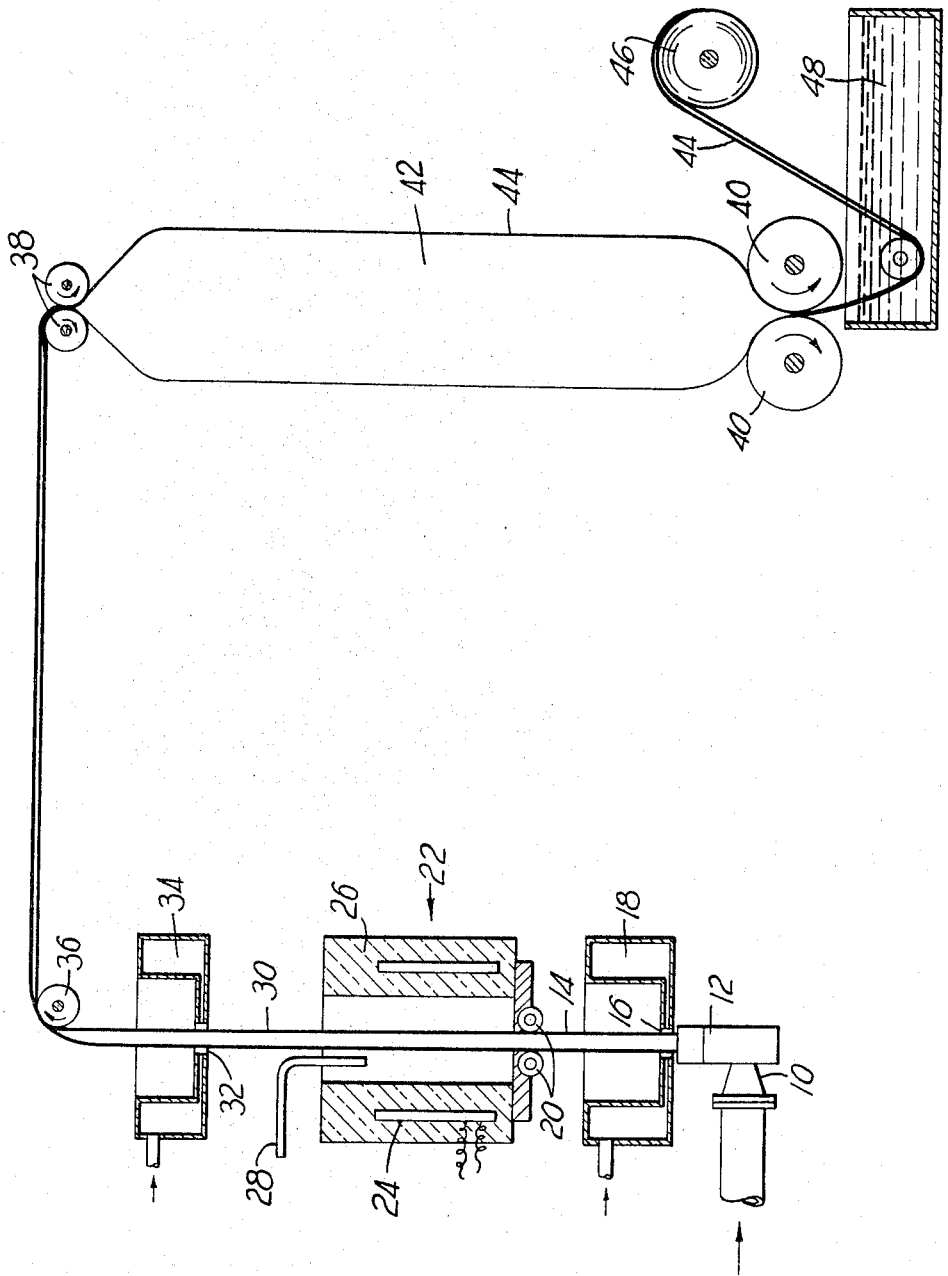
INVENTOR.
JOHN ROBERT GRAHAM
BY *John F. Hohmann*
ATTORNEY 3,278,663
METHOD FOR PRODUCING BIAXIALLY ORIENTED EXTRUDED POLYMERIC FILM
John Robert Graham, Wayne, N.J., assignor to Union Carbide Corporation, a corporation of New York
Filed Feb. 4, 1963, Ser. No. 255,950
16 Claims. (Cl. 264—95)

This invention relates to extrusion of polymeric film. It more particularly refers to a method of making biaxially oriented tubular, extruded films from vinylidene chloride-containing polymers.

It is presently established practice to extrude vinylidene chloride containing polymers in tubular form in the downward direction into a quench bath. These polymers are quenched at about 0° C. to 40° C. and show extreme tackiness with very high blocking values between the walls of the tube in contact with each other. Since it is often necessary to pass the quenched film over a change of direction roller or between a pair of a set of pinch or squeeze rollers, these high blocking values have been a great problem to the industry.

In the past, the art has attempted to remedy this rather difficult situation by palliatives; that is, many suggestions have been made which involve the use of lubricants within the extruded tube as it is quenched and while it is collapsed, as upon changing direction of travel or passing through the nip of a pair of rolls.

While the expedient of internal lubrication has accomplished its purpose, that is, to reduce the tendency of the surface of the polymeric films to stick together or to other surfaces, disadvantages are encountered in this method. Thus, a film of lubricant remains on the internal surface of the extruded tube which detracts from the purity of the film formed therefrom and which may have adverse effects on subsequent processing steps.

It is, therefore, the principal object of this invention to do away with the necessity of using lubricants in the preparation of tubular, extruded vinylidene chloride containing polymers.

It is a further object of this invention to provide an extrusion process for these polymers which does not require the use of lubricants.

It is another object of this invention to provide an extrusion process by which biaxially orientable tubular film may be made of vinylidene chloride containing polymers without the use of lubricants.

Fulfilling these objects this invention resides, in its basic aspects, in the partial crystallization of vinylidene chloride containing polymers as tubular extruded films after extrusion thereof but before orientation thereof.

Understanding of this invention will be facilitated by reference to the accompanying drawing which is a diagrammatic elevation partially in section of a production line for making film according to this invention.

This invention eliminates the need for lubricants by substantially reducing the tackiness of the extruded polymeric film surface to a level where collapsed film internal blocking is no longer a problem. This is accomplished by crystallizing the polymer to an extent sufficient to reduce surface tackiness to a workable level, but insufficient to impair orientability. The practice of this invention also eliminates the necessity of using a quench bath as required by the prior art. Since it is not practical to biaxially orient a totally crystalline polymer in tubular form, it is important that the polymer is not made so crystalline as not to be orientable. Should the polymer be crystallized to an extent greater than will readily permit biaxial orientation thereof at room temperature, it is practical to warm this partly crystallized polymer prior to orientation and before the tubing is collapsed. Partial crystallization according to this invention must be carried out between extrusion and the point where tubing first comes into film surface to film surface contact.

It has been found that if tubular extruded film which is useful in this invention is quenched immediately after extrusion according to prior art techniques, it retains its amorphous characteristics. However, if this same extruded amorphous film is heated, the amorphous character changes into a crystalline character with time. Partial crystallization is accomplished by mildly heating the polymer for a length of time less than necessary to totally crystallize. Crystallization rate then is dependent upon both time at a given temperature.

Defining this invention with more particularity, a normally crystalline melt extrudable vinylidene chloride containing polymer is melt extruded and rapidly cooled to a temperature which is just low enough to make the film self-supporting as extruded. The film is then subjected to a temperature which is adjusted in conformity with the desired crystallization rate and held at this temperature for a time sufficient to partially crystallize the polymer. When sufficient crystallinity has been imparted to the polymeric film to reduce tackiness, but not so much as to impair orientability, the temperature is then lower to arrest the crystallization.

When the extruded polymer film has been brought to a desired degree of crystallinity, it is then oriented either at room temperature or higher depending upon the extent crystallinity imparted to the polymer. In the case of extruded seamless tubing, biaxial orientation is accomplished by passing the tubing between two sets of spaced rollers travelling at different speeds while maintaining gas pressure inside the isolated bubble thus formed between the nips of each pair of rolls.

Referring now to the accompanying drawing, a polymeric composition is melt extruded into film by means of an extruder 10 through a die 12, which may be annular or slot type. It has been found that the width of the orifice is preferably twice the thickness of the finally extruded amorphous film in order to minimize decomposition. The extruded film 14 is passed through an initial cooling zone 16 which may for example be an air ring 18, a spray water device, a mixture of air and water or the like, and thence between guide rolls 20 into a heating chamber 22, which may for example be an infra-red source 24 mounted on a reflecting surface 26 for example, where the extruded film 14 is brought to a suitable crystallization temperature. Chamber temperature measurement may be accomplished by a thermocouple 28. The speed of travel of the extruded film 14 through the heating chamber 22 is adjusted so that as the film emerges from the heating chamber 22 it has been partially crystallized to a desired extent. Since crystallization rate is dependent upon the temperature of the polymer the residence time thereof in the heating chamber must be varied with relation to the heating temperature in order to impart a given crystallinity. The partially crystallized film 30 is then subjected to another cooling zone 32, which may be an air ring 34 or other device as previously described, in order to lower the film 30 temperature sufficiently to arrest crystallization thereof.

The film 30 is shown in the accompanying drawing as passing over a change of direction roller 36. It will be understood that this roller 36 forms no part of this invention and is merely a matter of convenience in positioning the appropriate equipment most efficiently. It is entirely within the scope of this invention to eliminate this roller 36 and pass the film 30 directly out of the cooling zone 32 into the nip of the driven rollers 38 which introduce the film into the orientation portion of this process. The film 30 is oriented, preferably biaxially by maintaining fluid pressure, for example an air bubble 42, within the tubular film 44 between the nips of the two sets of rollers 38 and 40. The peripheral speed of the draw rollers 40 is kept higher than that of the driven rollers 38 in order to impart machine direction orientation and also to take up any slack in the isolated bubble due to orientation and stretching. After orientation, the film 44 is conveniently wound up on a spool 46.

It may, in some cases, be desirable for storage and shipping to stabilize the oriented film 44 to provide dimensional stability thereto up to the temperature of storage, i.e., up to 120–140° F. If this is to be accomplished, a heating zone, for example a water bath 48, is provided between the draw rolls 40 and the spool 46. The film 44 is allowed to shrink until taut during the stabilizing heating step described above. Stabilization may also be accomplished with tubular film by utilizing two pairs of spaced squeeze rollers with the film inflated by an entrapped fluid bubble, preferably air, between the nips of these rollers. The stabilizing heating zone is positioned adjacent the inflated portion of the tubing.

It is to be understood that film extrusion according to this invention may be in any direction convenient to the processes. It is, however, presently preferred to extrude upwardly in order to permit better control of the uniformity of the film.

The temperature of the cooling zone immediately following the extruder die must be low enough to allow the extruded film to become self-supporting but it should be sufficient to maintain dimensional stability and to prevent variation in film flat width known in the art as "cycling." This cooling should be effected in such a manner as to prevent distortion of the film surface.

The degree of crystallinity imparted to the extruded film should be at least that necessary to reduce the tackiness of the film to an extent sufficient to prevent blocking. Where the film is extruded as a seamless tube, the crystallinity should be such as to permit easy opening of the tube, after it has passed through the driven rollers, by air pressure slightly above atmospheric at room temperature. The maximum crystallinity imparted to an extruded film according to this invention is the highest degree of crystallinity which will still permit biaxial orientation of the extruded film. The exact absolute degree of crystallinity to meet this requirement will of course vary with the composition of the particular polymer involved. It is to be understood that if this maximum crystallinity to allow orientation at room temperature is exceeded in the parital crystallization step, the film may be preheated prior to orientation to impart orientability thereto. This latter step of preheating is not shown in the drawing. It should be understood that one of the uses of the oriented shrinkable films made according to this invention is shrink packaging. The oriented and fully stabilized film can be used for packaging meat and other food products.

Density may be used as a measure of crystallinity. Thus, a completely amorphous film of the composition which is the polymerization product of 85 weight percent vinylidene chloride, 9 weight percent vinyl chloride and 6 weight percent butyl acrylate has a density of about 1.612 grams per cubic centimeter whereas a totally crystallized film of this composition has a density of about 1.645 grams per cubic centimeter. For this polymeric film, the preferred degree of partial crystallization corresponds to a film density of about 1.618 grams per cubic centimeter. In order to produce this degree of crystallinity, the melt extruded film was initially cooled to between about 80° F. to 90° F. and was heated to about 105° F. to 120° F. in about 35 to 55 seconds in order to impart the desired degree of crystallinity. These temperatures were recorded by means of a thermocouple in proximity to but not in contact with the film surface. After this heating the partially crystalline film was quickly brought to room temperature which temperature was sufficiently low to substantially arrest the crystallization phenomenon.

It has been found that polymeric films useful in this invention vary in crystallization rate according to temperature. In static tests conducted in an oven, it was found that the copolymerization product of 85 weight percent vinylidene chloride, 9 weight percent vinyl chloride and 6 weight percent butylacrylate reached maximum crystallinity in about 5 minutes at 175° F.; at 150° F. it takes about 18 minutes; at 125° F. it takes about 40 minutes; at 100° F. it takes about 2 hours; and at 75° F. it takes about 6 hours. The temperature hold time in the practice of this invention is of course much less since only partial crystallization of the polymer film is desired. These data are directly related to the requirements of dynamic operation on full scale production equipment.

Partially crystallized polymer film produced according to this invention is readily biaxially oriented at room temperature. Where the film is extruded as seamless tubing, this orientation may be accomplished by forming an isolated air bubble in the tubing, of a magnitude to readily expand the tubing between two sets of squeeze rollers travelling at differential peripheral speeds. This causes the tube to expand both in the machine and in the transverse directions. Expansions have been effected at 3 to 5 times in the transverse direction and 2 to 4 times in the machine direction. The air bubble preferably extends the full distance between the driven set of rollers and the draw rollers. This is important in order to prevent oscillation of the bubble to any variations in the tackiness or degree of partial crystallization of the film.

The following example is illustrative of the practice of this invention, proportions being given as parts by weight:

A composition consisting of 95 parts of the polymerization product of a monomer charge ratio of 85 parts of vinylidene chloride, 9 parts of vinyl chloride, and 6 parts of butyl acrylate; 3 parts of epoxidized soybean oil; 2 parts of dibutyl sebacate; 0.1 part of magnesium stearate; 0.3 part of hydrogenated castor oil; 0.3 part of silica; and 0.05 part of butylated hydroxy toluene was melt extruded at 300° F. through an annular die having an inside diameter of 1⅝ inches and a die gap of 0.031 inch, and drawn from the die at a speed of about 2 feet per minute. The initial cooling of the extruded film to provide self support thereto was accomplished by passing about 110 cubic feet per minute of room temperature air past the extruded film. Air pressure slightly above atmospheric just sufficient to inflate the tube was maintained inside the extruded seamless tube. As it passed the initial cooling stage the extruded tube had a diameter of about 1.67 inches and a wall thickness of about 0.0085 inch. The extruded tube was passed through a radiant heater operating at 140° F. wherein the density of the tube was raised from 1.61 to 1.62 grams per cubic centimeter. A second cooling ring above the heater issued 220 cubic feet per minute of room temperature air past the partially crystallized extruded tubing to arrest the crystallization phenomenon. Biaxial orientation of the partially crystallized tube was accomplished between a set of 4 inch diameter squeeze rollers and a set of 12 inch squeeze rollers set 6 feet apart with the 12 inch diameter rollers driven at a peripheral speed of 6.5 feet per minute. A minimum squeeze pressure sufficient to prevent air leakage was applied to the film by both sets of rollers. An air bubble was maintained within the tube between the nips of the two sets of rollers sufficient to increase the tube diameter to 7⅜ inches. After orientation the film was immersed in a water bath at 110° F. for about 10 seconds.

Polymeric compositions which are particularly adapted to use in this invention are those which contain sufficient vinylidene chloride to form a crystallizable polymer but not so much as to make the polymer brittle when shaped. The preferred polymers are those which on melting become amorphous and on quenching remain amorphous. Of particular interest in this invention are those polymers preferably made up of at least 75 percent vinylidene chloride copolymerized with a minor amount of at least one or more of the following monomers; vinyl chloride, vinyl bromide, vinyl fluoride, vinyl acetate, vinyl propionate, vinyl butyrate, ethyl acrylate, propyl acrylate, butyl acrylate, hexyl acrylate, heptyl acrylate, octyl acrylate, decyl acrylate, methyl methacrylate, ethyl methacrylate, methyl ethacrylate, butyl methacrylate, acrylic acid, methacrylic acid, furmaric acid, maleic acid, butadiene acrylonitrile, allyl chloride, vinyl ethyl ether, 2-chloroethyl vinyl ether, vinyl methyl ketone and methyl isopropenyl ketone. These many compounds fall into subgeneric groups such as vinyl halides, vinyl esters, alkyl acrylates, aryl acrylates, alkyl methacrylates, aryl methacrylates, alkyl and aryl ethacrylates, substituted acrylic acids, substituted methacrylic and ethacrylic acids, unsaturated acids, esters of unsaturated acids, and vinyl alkyl ethers and ketones.

The principles of this invention are also applicable to other crystallizable polymers such as for example poly-3,3-bis-chloromethyl oxetane.

It is of course well within the scope of this invention to include conventional proportions of constituents such as stabilizers, anti-oxidants, pigments, dyes, anti-fog agents, anti-static agents and the like in the polymeric compositions described herein so long as they do not change the final film properties so as to depart from the invention as set forth herein.

It is to be understood that while the aspects of this invention have been described primarily with relation to tubular, extruded film, this invention is equally applicable to slot extruded film and also to fibers. With respect to fibers, this invention is particularly valuable since it makes it possible to orient a large number, or tow, of fibers at one time without the problem of blocking between the individual fibers.

What is claimed is:

1. The method of producing a biaxially oriented polymeric structure comprising melt extruding in air a normally crystalline polymer and rapidly cooling the resulting extrudate to a temperature at which there is formed a self-supporting amorphous tubular structure; partially crystallizing said tubular structure by subjecting it to heat in a gaseous atmosphere before surface-to-surface contact of the walls of said tubular structure occurs at a temperature and for a period such that the ability to biaxially orient said tubular structure is not impaired and the tackiness thereof is sufficiently reduced to prevent blocking; and biaxially orienting the partially crystalline tubular structure.

2. The method according to claim 1 wherein said polymer is the copolymerization product of at least 75 weight percent vinylidene chloride with a minor amount of at least one of the compounds selected from the group consisting of vinyl chloride, butyl acrylate, vinyl bromide, vinyl fluoride, vinyl acetate, vinyl propionate, vinyl butyrate, ethyl acrylate, propyl acrylate, amyl acrylate, hexyl acrylate, heptyl acrylate, octyl acrylate, 2-ethylhexyl acrylate, decyl acrylate, methyl methacrylate, ethyl methacrylate, butyl methacrylate, methyl ethacrylate, ethyl ethacrylate, acrylic acid, methacrylic acid, fumaric acid, maleic acid, dimethyl maleate, diethyl maleate, itaconic acid, butadiene, acrylonitrile, allyl chloride, styrene, methyl vinyl sulfone, methallyl chloride, vinyl ethyl ether, 2-chloroethyl vinyl ether, vinyl methyl ketone and methyl isopropenyl ketone.

3. The method according to claim 1 wherein said resin is poly-3,3-bis-chloromethyl oxetane.

4. The method according to claim 1 wherein said resin is composed of the terpolymer vinylidene chloride-vinyl chloride-butyl acrylate.

5. The method according to claim 1 wherein said resin is composed of the copolymer vinylidene chloride-butyl acrylate.

6. The method according to claim 1 wherein said extrudate is cooled after extrusion to about 80° F. to 90° F. and said cooled extrudate is then reheated to about 105° F. to 120° F. for about 35 to 55 seconds.

7. The method according to claim 1 wherein said oriented tubular film is inflated taut and subjected to a temperature of about 120° F. to 140° F.

8. The method according to claim 1 wherein said normally crystalline polymer contains at least 75 weight percent combined vinylidene chloride.

9. The method according to claim 1 wherein the tubular film is biaxially oriented by forming an isolated air bubble within the wall of said tubing between two fixed, spaced apart points, said air bubble being of a magnitude such that said tubing is biaxially oriented in the machine direction and in the transverse direction.

10. The method which includes heating a normally crystalline polymer containing at least 75 weight percent combined vinylidene chloride to the amorphous state; extruding said amorphous polymer in air as seamless tubular film and rapidly cooling said tubular film in an initial cooling zone; partially crystallizing said tubular polymer by heating said tubular polymer in air before surface-to-surface contact of the walls of said tubular structure occurs at a temperature and for a period such that the ability to biaxially orient said tubular polymer is not impaired and said film is in a relatively tack free state; biaxially orienting said tubular film while inflated; and heating said oriented tubular film such that said tubular film is stabilized with respect to shrinkage up to the temperature of said heating.

11. The method of producing biaxially oriented polymeric film containing at least 75 weight percent vinylidene chloride comprising melt extruding said film; in air; rapidly cooling said film immediately upon extrusion to a temperature at which a self-supporting article is formed; heating said extruded film in a gaseous atmosphere to a temperature at which the tackiness of said polymer is reduced and at which said polymer is only partially crystallized; lowering the temperature of said partially crystallized polymer to a degree sufficient to arrest crystallization thereof; and biaxially orienting said partially crystallized film.

12. The method of producing a biaxially oriented tubular polymeric structure comprising:
    (a) melt extruding in air in the form of a tubing a normally crystalline polymer which contains at least 75 weight percent combined vinylidene chloride;
    (b) rapidly cooling said extruded polymer in a gaseous atmosphere to a temperature at which there is formed a self-supporting amorphous tubular structure;
    (c) heating said self-supporting amorphous tubular structure in a gaseous atmosphere to a temperature at which the tackiness of said tubular structure is reduced and at which said polymeric tubular structure is only partially crystallized;
    (d) lowering the temperature of said partially crystallized tubular structure in a gaseous atmosphere to a degree sufficient to arrest crystallization of said tubular structure such that the blocking characteristics of said tubular structure is reduced to a degree sufficient to permit surface-to-surface contact of the walls of said tubular structure without impairing subsequent separation of the walls of said tubular structure thus contacted; and
    (e) biaxially orienting said tubular structure by forming an isolated air bubble within the walls of said tubular structure between at least two, fixed spaced-apart points, said air bubble being of a magnitude sufficient to biaxially orient said tubular structure in both the machine and the transverse direction.

13. The method which includes heating a normally crystalline polymer to the amorphous state; shaping said amorphous polymer; extruding the thusly shaped polymer in air; rapidly cooling said shaped, extruded polymer in air at a temperature and for a period such that said polymer is in a relatively self-sustaining state; partially crystallizing said polymer by subjecting it to heat for a period and at a temperature such that the tackiness of said partially crystallized polymer is reduced to a degree sufficient to prevent surface-to-surface blocking of said partially crystallized polymer but insufficient to impair orientability of said partially crystallized polymer; and orienting said partially crystallized polymer.

14. The method of claim 13 wherein the normally crystalline polymer contains at least 75 weight percent combined vinylidene chloride.

15. The method of claim 13 wherein the shaped, extruded polymer is in the form of a tubing.

16. The method of claim 15 wherein the tubular structure is biaxially oriented.

References Cited by the Examiner

UNITED STATES PATENTS

| | | |
|---|---|---|
| 2,183,602 | 12/1939 | Wiley. |
| 2,344,511 | 3/1944 | Harder. |
| 2,445,726 | 7/1948 | Willert _____ 264—210 |
| 2,476,140 | 7/1949 | Francis _____ 264—95 |
| 2,634,459 | 4/1953 | Irons _____ 264—95 |
| 2,688,773 | 9/1954 | McIntire _____ 264—95 |
| 2,880,057 | 3/1959 | Cuculo _____ 264—210 |
| 2,916,764 | 12/1959 | Gerber _____ 264—95 |
| 3,056,768 | 10/1962 | Foglia _____ 260—86.3 |
| 3,066,008 | 11/1962 | Carpenter et al. _____ 264—290 |
| 3,088,937 | 5/1963 | Trofimow et al. _____ 260—87.7 |
| 3,090,998 | 5/1963 | Heisterkamp et al. ____ 264—95 |

OTHER REFERENCES

Jack, "Biaxial Stretching of Polypropylene," British Plastics, vol. 34, No. 6, pp. 312–318 (1961).

ROBERT F. WHITE, *Primary Examiner.*

ALEXANDER H. BRODMERKEL, *Examiner.*

K. W. VERNON, A. R. NOE, *Assistant Examiners.*